United States Patent
Mogi et al.

(10) Patent No.: US 11,772,457 B2
(45) Date of Patent: Oct. 3, 2023

(54) COWL GRILLE STRUCTURE OF VEHICLE

(71) Applicant: MAZDA MOTOR CORPORATION, Hiroshima (JP)

(72) Inventors: Hosei Mogi, Hiroshima (JP); Atsushi Nakamura, Hiroshima (JP); Hidekazu Morikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 63 days.

(21) Appl. No.: 17/533,817

(22) Filed: Nov. 23, 2021

(65) Prior Publication Data

US 2022/0281289 A1     Sep. 8, 2022

(30) Foreign Application Priority Data

Mar. 4, 2021   (JP) ................................. 2021-034253

(51) Int. Cl.
*B60H 1/28* (2006.01)
*B62D 25/08* (2006.01)

(52) U.S. Cl.
CPC ............. *B60H 1/28* (2013.01); *B62D 25/081* (2013.01); *B62D 25/088* (2013.01)

(58) Field of Classification Search
CPC .. B62D 25/08; B62D 25/2018; B62D 25/081; B62D 25/105; B62D 25/24; B60R 13/07; B60R 13/0869; B60H 1/28
USPC ................................................ 296/192, 39.3
See application file for complete search history.

(56) References Cited

U.S. PATENT DOCUMENTS

| | | | |
|---|---|---|---|
| 2005/0067859 A1* | 3/2005 | Yoshii ................... | B62D 25/081 296/192 |
| 2005/0179285 A1* | 8/2005 | Nakajima ............ | B62D 25/081 296/192 |
| 2006/0232106 A1* | 10/2006 | Haas .................... | B62D 25/081 296/208 |

(Continued)

FOREIGN PATENT DOCUMENTS

| | | | | |
|---|---|---|---|---|
| DE | 19811189 C1 * | 9/1999 | ......... | B60H 1/00028 |
| EP | 1308373 A1 * | 5/2003 | ........... | B62D 25/081 |

(Continued)

OTHER PUBLICATIONS

DE-19811189-C1 machine translation (Year: 1999).*

*Primary Examiner* — Dennis H Pedder
*Assistant Examiner* — Kevin P Weldon
(74) *Attorney, Agent, or Firm* — Studebaker & Brackett PC

(57) ABSTRACT

A cowl grille comprises a member portion which extends in a vehicle width direction below a front windshield so as to receive water dripping from the front windshield, a cover portion which is positioned in front of a member portion and covers over an auxiliary equipment, a partition portion which extends downwardly from the cover portion and partitions a space where an engine is arranged from another space where the auxiliary equipment is arranged, and a cowl seal which extends in the vehicle width direction and contacts a bonnet so as to seal between a vehicle outside space and an engine room. The cowl seal is positioned at a front part of the member portion, and the cover portion is made of a plate member and provided to perform heat insulating between a space positioned above the cover portion and another space positioned below the cover portion.

9 Claims, 7 Drawing Sheets

(56) References Cited

U.S. PATENT DOCUMENTS

| | | | | |
|---|---|---|---|---|
| 2010/0096884 A1* | 4/2010 | Schmidt | ............... | B62D 25/087 |
| | | | | 296/187.01 |
| 2018/0170446 A1* | 6/2018 | Muraki | ................... | B60R 13/07 |
| 2019/0106078 A1* | 4/2019 | Nakamura | ........... | B62D 29/005 |
| 2020/0269785 A1* | 8/2020 | Salter | ..................... | H01G 11/78 |
| 2021/0253177 A1* | 8/2021 | Yamauchi | .............. | B62D 25/10 |

FOREIGN PATENT DOCUMENTS

| | | | | |
|---|---|---|---|---|
| JP | 2018-043602 A | 3/2018 | | |
| WO | WO-2017169586 A1 * | 10/2017 | ............. | B60K 11/04 |

\* cited by examiner

COWL GRILLE STRUCTURE OF VEHICLE

BACKGROUND OF THE INVENTION

The present invention relates to a cowl grille structure of a vehicle, and more specifically, relates to the cowl grille structure of the vehicle which comprises a dash panel extending in a vehicle width direction below a lower end portion of a front windshield and partitioning an engine room from a cabin in a vehicle longitudinal direction, a pair of front side frames extending forwardly from both-end sides, in the vehicle width direction, of the dash panel, a suspension tower portion fixed at each of the front side frames and protruding upwardly so as to support an upper portion of a damper of a suspension device, an auxiliary equipment provided between the suspension tower portion and the dash panel in the vehicle longitudinal direction, and a cowl grille positioned below the front windshield and in front of the dash panel.

Conventionally, a structure disclosed in Japanese Patent Laid-Open Publication No. 2018-43602 is known as an example of the above-described cowl grille structure of the vehicle. That is, this publication discloses the structure in which an auxiliary equipment which is weak against heat damage, such as a battery, is arranged between a top portion of a suspension housing and a dash lower panel, an upper side of the auxiliary equipment is covered with a cover portion of a cowl grille, and a cowl seal to seal between a bonnet and the cover portion is provided at a front end of the cover portion, whereby the auxiliary equipment is protected from the heat damage caused by an engine.

In this conventional structure, while an upper space where the auxiliary equipment which is weak against the heat damage is arranged can be made to be a cool zone properly because of arrangement of the cowl seal at the front end of the cover portion, there is a problem described below.

That is, since it is necessary that a passage of air which is introduced from an outside-air introduction hole and a drain passage of water are provided at the cowl grille, the above-described conventional structure is configured to form a drain duct and also to have a labyrinth structure of the air passage in order to suppress the auxiliary equipment from becoming wet with water and also to suppress the water from coming into a supply port provided at a downstream end of the air passage which connects to the outside-air introduction hole.

Therefore, there is the problem in that the formability of the cowl grille may become complicated, material costs may increase, and the weight of the cowl grille may increase.

SUMMARY OF THE INVENTION

Accordingly, an object of the present invention is to provide a cowl grille structure of a vehicle which can compatibly attain water-wet prevention and heat-damage prevention of the auxiliary equipment, without complicating the structure of the cover portion.

The present invention is a cowl grille structure of a vehicle, comprising a dash panel extending in a vehicle width direction below a lower end portion of a front windshield and partitioning an engine room from a cabin in a vehicle longitudinal direction, a pair of front side frames extending forwardly from both-end sides, in the vehicle width direction, of the dash panel, a suspension tower portion fixed at each of the front side frames and protruding upwardly so as to support an upper portion of a damper of a suspension device, an auxiliary equipment provided between the suspension tower portion and the dash panel in the vehicle longitudinal direction, and a cowl grille positioned below the front windshield and in front of the dash panel, wherein the cowl grille comprises a member portion which extends in the vehicle width direction below the front windshield so as to receive water dripping from the front windshield, a cover portion which is positioned in front of the member portion and covers over the auxiliary equipment, a partition portion which extends downwardly from the cover portion and partitions a space where an engine is arranged from another space where the auxiliary equipment is arranged, and a cowl seal which extends in the vehicle width direction and contacts a bonnet so as to seal between a vehicle outside space and an engine room, the cowl seal is positioned at a front part of the member portion, and the cover portion is made of a plate member and provided to perform heat insulating between a space positioned above the cover portion and another space positioned below the cover portion. The above-described auxiliary equipment may be a battery and the above-described cowl seal may be a weatherstrip.

According to the present invention, since the cowl seal to seal between the vehicle outside space and the engine room is arranged at the front part of the member portion, the cover portion which is positioned in front of the member portion does not become wet with the water. Therefore, the cover portion can be suppressed from being complicated unnecessarily and excessively.

Further, since the cover portion performs the heat insulating between the space positioned above the cover portion and the other space positioned below the cover portion, the auxiliary equipment can be protected from the heat damage. That is, the water-wet prevention and the heat-damage prevention of the auxiliary equipment can be compatibly attained, without complicating the structure of the cover portion.

In an embodiment of the present invention, the cover portion has a non-hole structure where no hole is formed. According to this embodiment, since the cover portion has the non-hole structure, air in the space positioned above the cover portion suppresses the auxiliary equipment from connecting to the space positioned below the cover portion, so that the further heat-damage prevention of the auxiliary equipment can be attained.

In another embodiment of the present invention, the cover portion is made of talc reinforced resin or fiber reinforced resin. Herein, glass fiber reinforced plastic (GFRP) may be preferably used as the fiber reinforced resin. According to this embodiment, the heat-resistance property and the heat-insulating property of the cover portion can be improved, so that the further heat-damage prevention of the auxiliary equipment can be attained.

In another embodiment of the present invention, an end portion, in the vehicle width direction, of the cowl seal is positioned closely to a bonnet hinge to support the bonnet. According to this embodiment, the support rigidity of the bonnet can be improved by the cowl seal.

Specifically, the bonnet is supported by a vehicle body at three points of a striker which is positioned at a center, in the vehicle width direction, of a front end of the bonnet and a pair of hinges which are positioned at left-and-right both sides, in the vehicle width direction, of a rear end of the bonnet, and a rear-end side of the bonnet is supported by the cowl seal when the bonnet is closed. Herein, in a case where the cowl seal is forwardly positioned far from the bonnet hinges, the support rigidity of the bonnet by the cowl seal decreases, so that there is a concern that the rear end of the bonnet may improperly lift up and swing.

The bonnet itself is excessively reinforced by a reinforcement or the like in order to suppress the bonnet from lifting up and swinging improperly in the conventional structure. According to this embodiment, however, the support rigidity of the bonnet can be improved by appropriate positioning of the cowl seal, without reinforcing the bonnet excessively.

In another embodiment of the present invention, a central portion, in the vehicle width direction, of the cowl seal is positioned on a rearward side, in the vehicle longitudinal direction, of a central portion, in the vehicle longitudinal direction, of the cover portion. According to this embodiment, the bonnet-support performance can be improved by the central portion, in the vehicle width direction, of the cowl seal.

Specifically, it is required to enlarge an area of an opening for maintenance of the cover portion and also enlarge an area of the outside-air introduction hole which is formed at the member portion of the cowl grille.

Accordingly, the bonnet-support performance can be improved by the central portion, in the vehicle width direction, of the cowl seal, securing both of the areas of the opening for the maintenance and the outside-air introduction hole by setting the longitudinal position of the central portion, in the vehicle width direction, of the cowl seal as described above.

In another embodiment of the present invention, the cover portion is positioned below, in a vertical direction, of a cowl-seal attachment portion where the cowl seal is attached. According to this embodiment, a vertical space is formed between the cowl seal provided at the cowl-seal attachment portion and the cover portion, in other words, between a bonnet lower face and the cover portion, which is superior in protection of a pedestrian. That is, the heat insulating structure by means of the cover portion and the pedestrian protection can be compatibly attained.

The other appropriate embodiments of the present invention will become apparent from the following description which refers to the accompanying drawings.

DETAILED DESCRIPTION OF THE INVENTION

Figure 1:
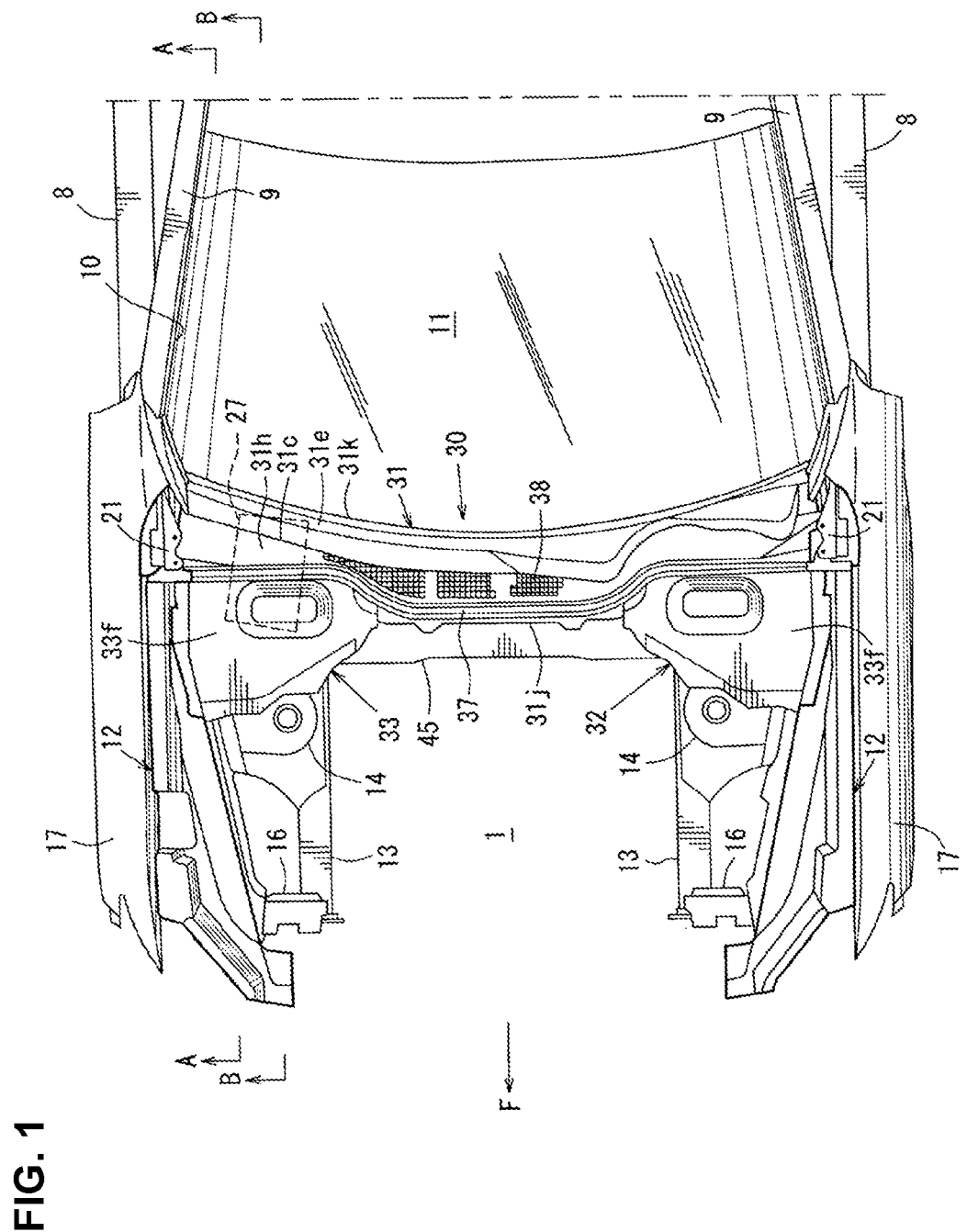
FIG. 1 is a major-part plan view of a vehicle which is equipped with a cowl grille structure of the present invention.
Figure 2:
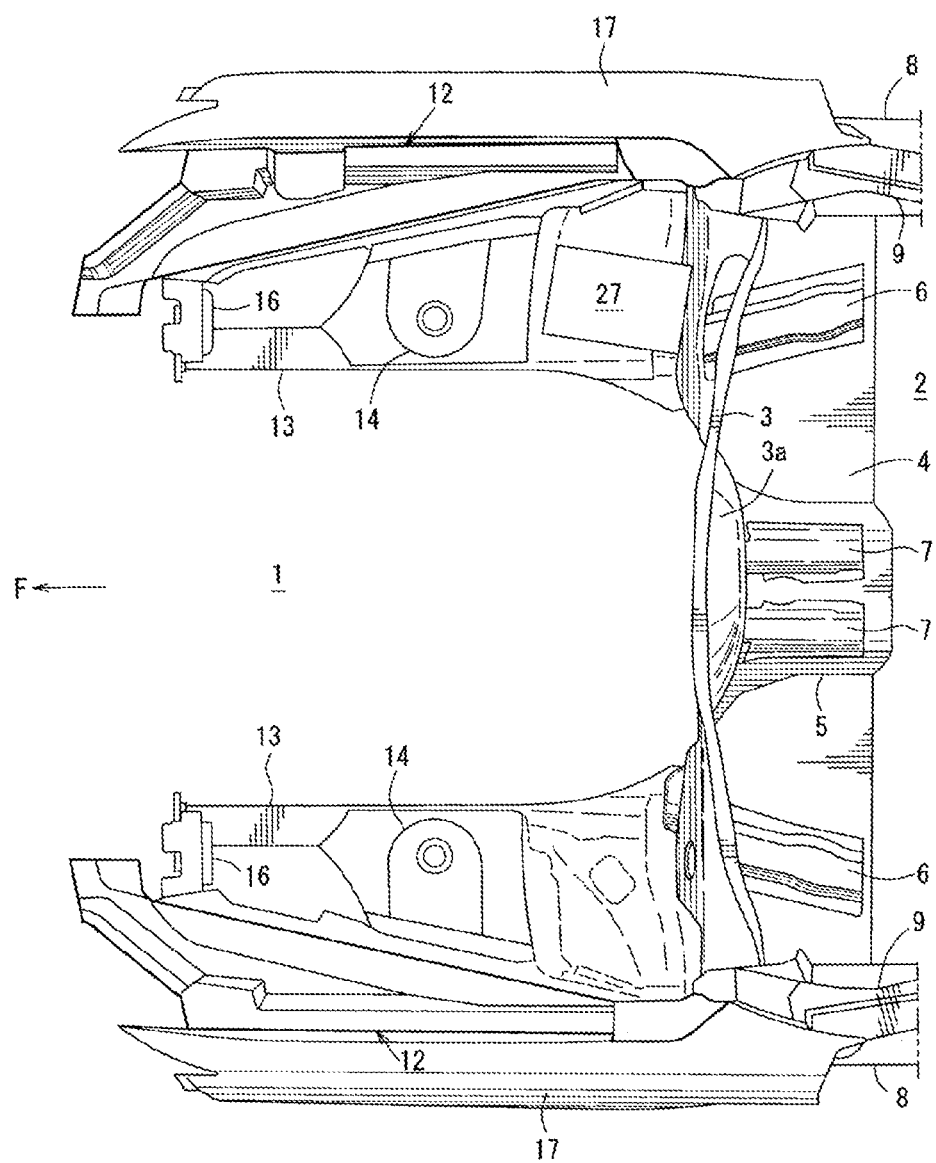
FIG. 2 is a major-part plan view of the vehicle in a state where a front window shield and a cowl grille are removed from the state shown in FIG. 1.
Figure 3:
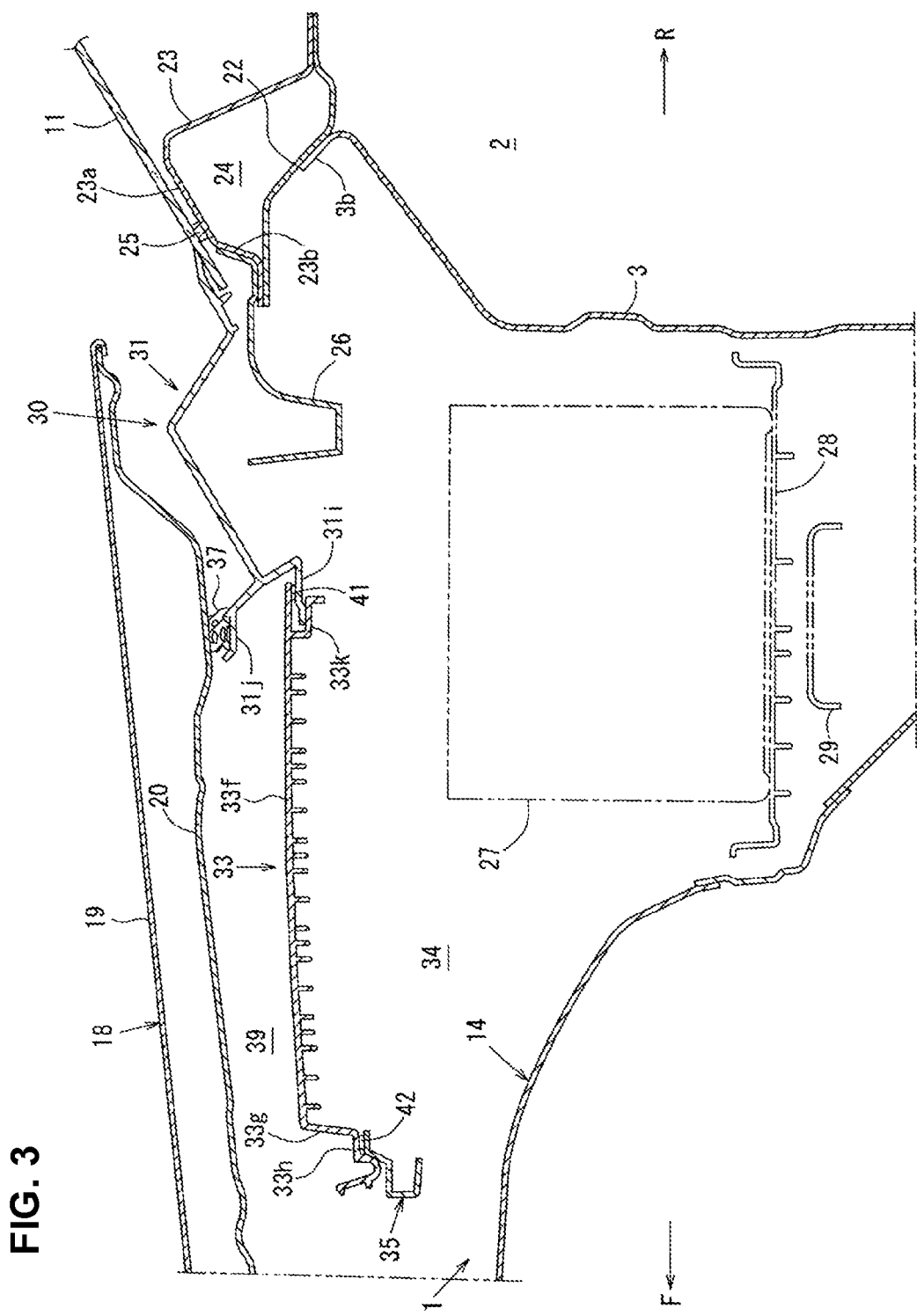
FIG. 3 is a major-part sectional view taken along line A-A of FIG. 1.
Figure 4:
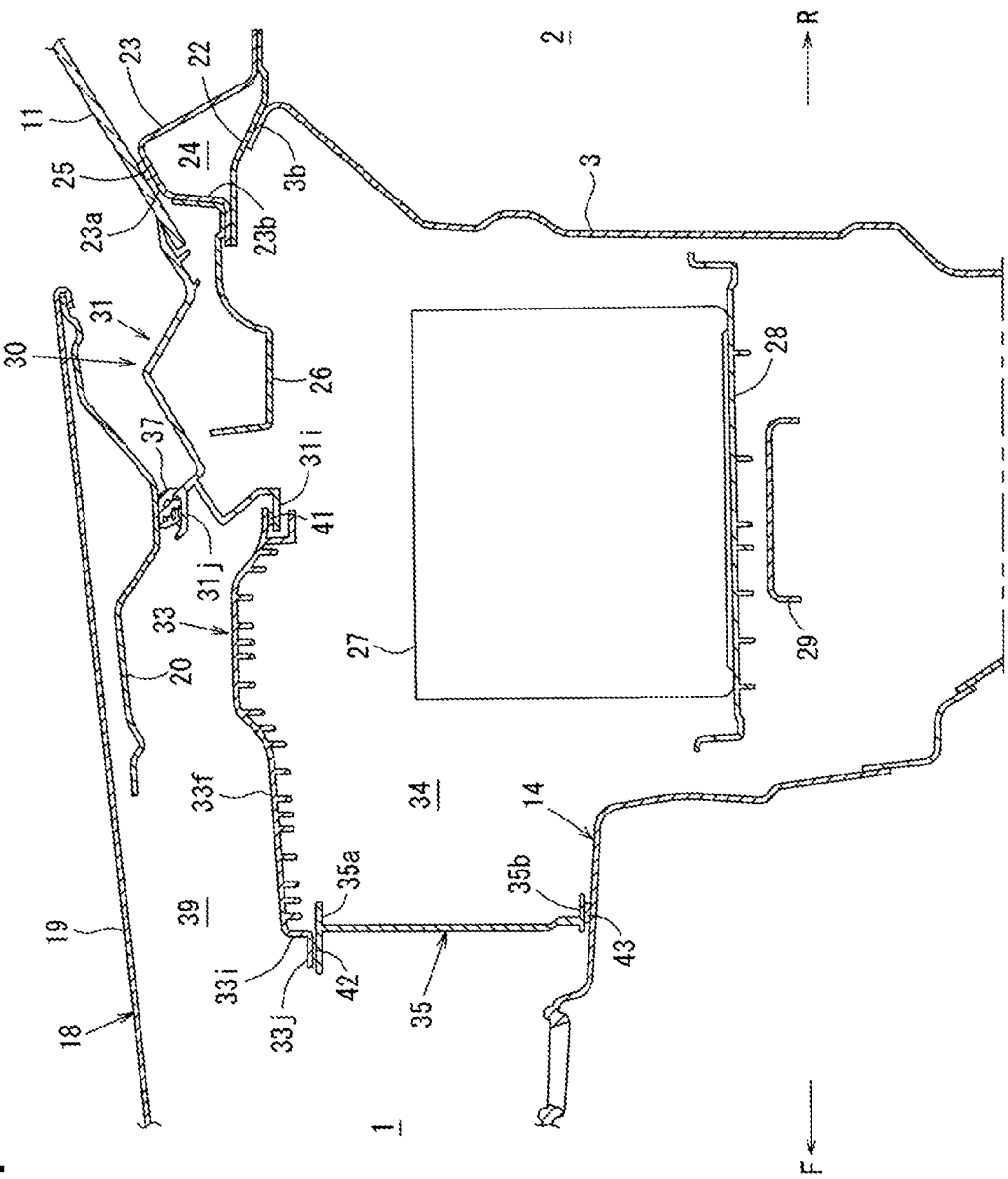
FIG. 4 is a major-part sectional view taken along line B-B of FIG. 1.
Figure 5:
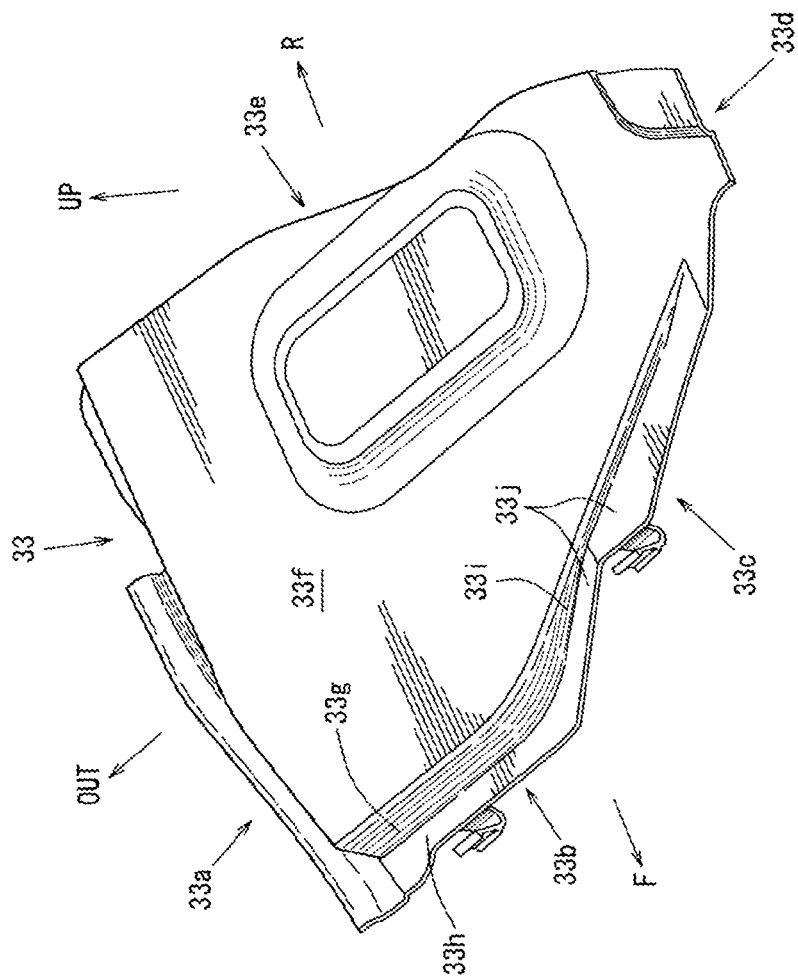
FIG. 5 is a perspective view showing a cover portion.
Figure 6:
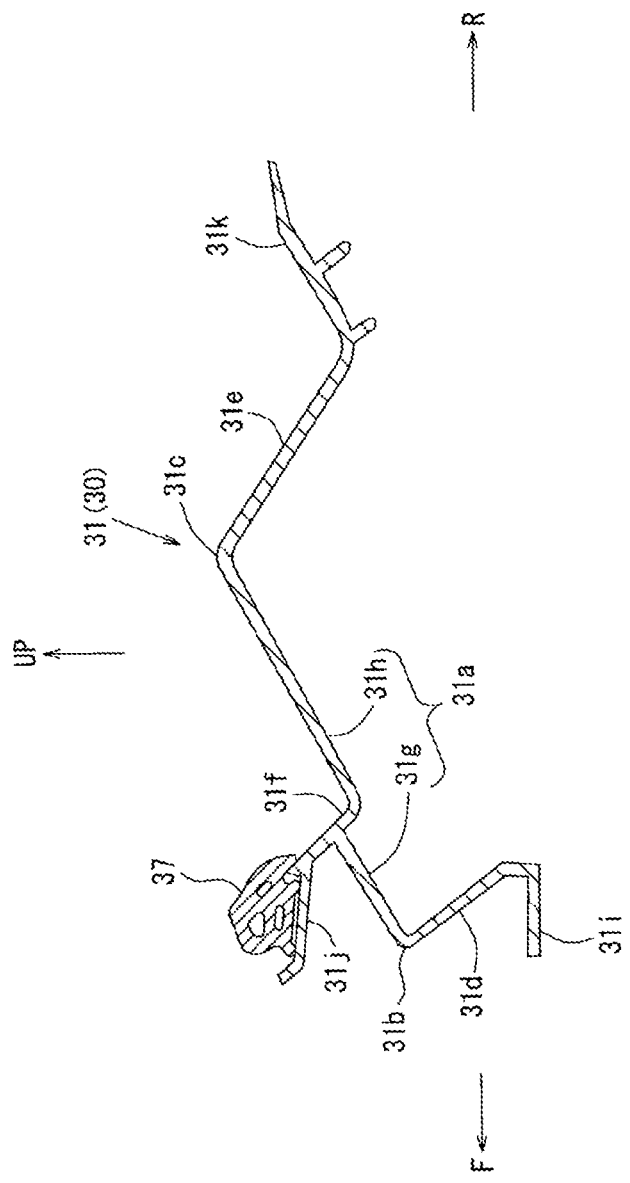
FIG. 6 is an enlarged sectional view showing a member portion of the cowl grille.
Figure 7:
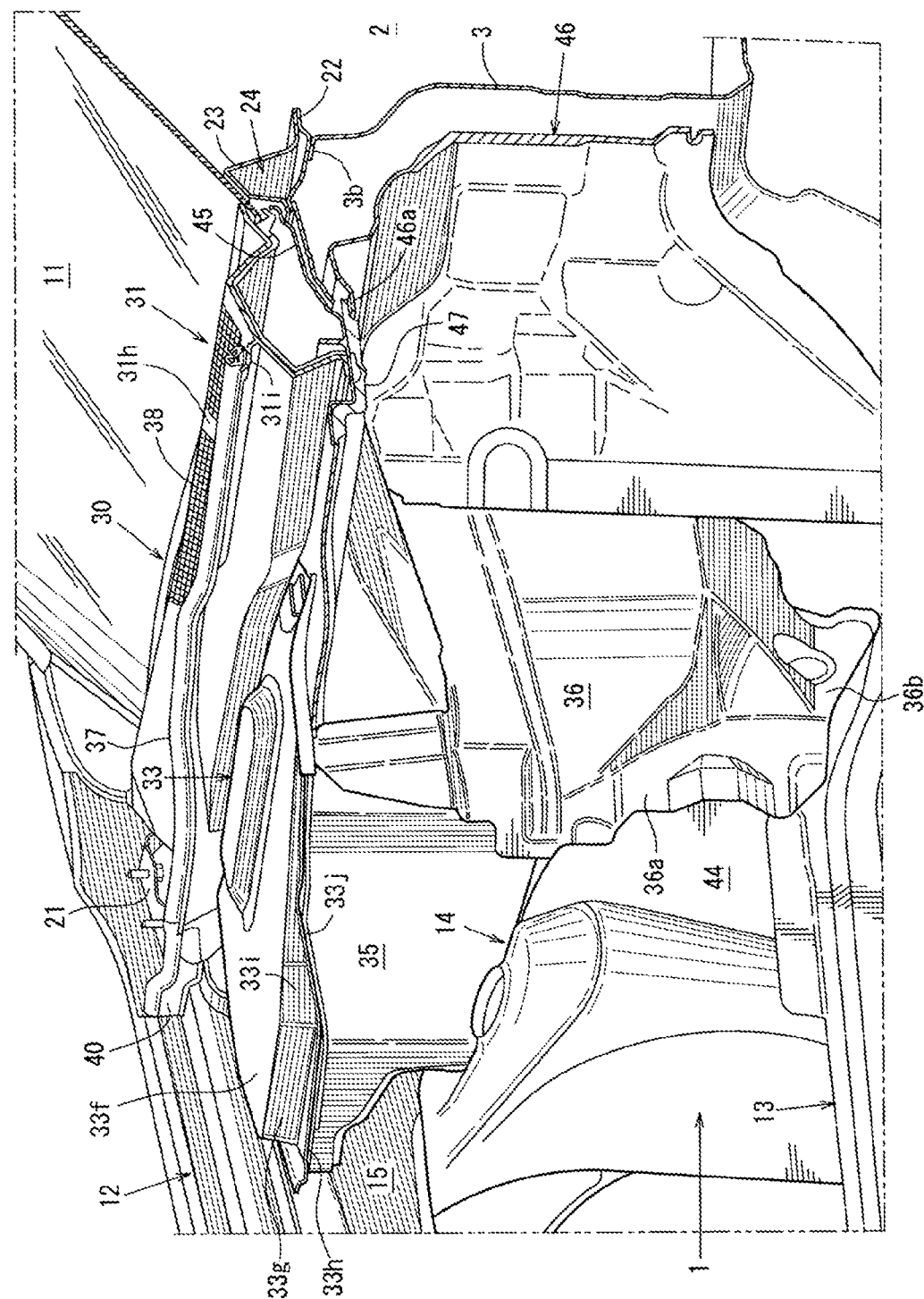
FIG. 7 is a perspective view showing the cowl grille structure of the vehicle.

An embodiment of the present invention will be described specifically referring to the drawings. The drawings shows a cowl grille structure of a vehicle. FIG. 1 is a major-part plan view of the vehicle which is equipped with the cowl grille structure of the present invention, FIG. 2 is a major-part plan view of the vehicle in a state where a front window shield and a cowl grille are removed from FIG. 1, FIG. 3 is a major-part sectional view taken along line A-A of FIG. 1, and FIG. 4 is a major-part sectional view taken along line B-B of FIG. 1. Further, FIG. 5 is a perspective view showing a cover portion, FIG. 6 is an enlarged sectional view showing a member portion of the cowl grille, and FIG. 7 is a perspective view showing the cowl grille structure of the vehicle.

First, a front vehicle-body structure will be described before the cowl grille structure of the vehicle. As shown in FIGS. 3, 4 and 7, a dash lower panel 3 is provided as a dash panel to partition an engine room 1 from a cabin 2 in a vehicle longitudinal direction. This dash lower panel 3 extends in a vehicle width direction, and right-and-left both end portions, in the vehicle width direction, of the dash lower panel 3 are respectively connected to hinge pillars, not illustrated.

As shown in FIG. 2, a tunnel portion 3a which is continuous to a floor tunnel 5 of a front floor panel 4 is formed at a lower part of a central portion, in the vehicle width direction, of the dash lower panel 3. As shown in FIG. 2, a floor frame 6 is fixedly joined to an upper face of a middle part, in the vehicle width direction, of the front floor panel 4 between the floor tunnel 5 and a side sill 8, which will be described later, so that a floor-frame closed-cross section extending in the vehicle longitudinal direction is formed between the floor frame 6 and the front floor panel 4, whereby the rigidity of a lower vehicle body is improved.

Further, as shown in FIG. 2, a tunnel reinforcement 7 is fixedly joined to an upper face portion of the floor tunnel 5, so that a closed-cross section extending in the vehicle longitudinal direction is formed between the tunnel reinforcement 7 and the floor tunnel 5, whereby the rigidity of the floor tunnel 5 is improved.

At right-and-left both side portions, in the vehicle width direction, of the dash lower panel 3 are provided the right-and-left hinge pillars extending in the vehicle vertical direction. This hinge pillar is a vehicle-body reinforcing member which has a hinge-pillar closed-cross section extending in the vehicle vertical direction which is formed by a hinge pillar inner and a hinge pillar outer which are fixedly joined together.

As shown in FIGS. 1 and 2, a side sill 8 which extends rearwardly from a lower end portion of the hinge pillar is provided at the lower end portion of the hinge pillar. This side sill 8 is a vehicle-body reinforcing member which has a side-sill closed-cross section extending in the vehicle longitudinal direction which is formed by a side sill inner and a side sill outer which are fixedly joined together.

Further, as shown in FIGS. 1 and 2, a front pillar 9 which extends obliquely rearwardly-and-upwardly from an upper end portion of the hinge pillar is provided at the upper end portion of the hinge pillar. This front pillar 9 is a vehicle-body reinforcing member which has a front-pillar closed-cross section extending obliquely rearwardly-and-upwardly which is formed by a front pillar inner and a front pillar outer which are fixedly joined together.

As shown in FIG. 1, a front window shield 11 (so-called front window glass) is provided at an opening portion 10 for arranging this front window shield which is enclosed by a pair of right-and-left front pillars 9, 9, a front header which is positioned at a vehicle upper-front side, and a cowl panel 23, which will be described later.

Herein, the dash lower panel 3 is a panel member which is positioned at a lower end portion of the front window shield 11 and partitions the engine room 1 from the cabin 2.

Meanwhile, as shown in FIGS. 2 and 7, an apron reinforcement 12 which extends forwardly from a front side of an upper end of the hinge pillar is provided at the front side of the upper end of the hinge pillar. As shown in FIGS. 1, 2 and 7, a pair of right-and-left front side frames 13 which extend forwardly from both end sides, in the vehicle width direction, of the dash lower panel 3 are provided. This front side frame 13 is positioned on an inward side, in the vehicle width direction, and on a lower side, in the vehicle vertical direction, of the apron reinforcement 12.

Further, the front side frame 13 is a vehicle-body reinforcing member which has a front-side-frame closed-cross section extending in the vehicle longitudinal direction which is formed by a front side frame inner and a front side frame outer which are fixedly joined together.

As shown in FIG. 7, there is provided a suspension tower portion 14 to support an upper portion of a damper of a front suspension device, not illustrated, which is fixed to the front side frame 13 and protrudes upwardly. As shown in this figure, the suspension tower portion 14 is provided to extend between a side panel 15 which constitutes an inside face of the apron reinforcement 12 and the above-described front side frame 13. Herein, a strut tower portion may be used as the suspension tower portion 14.

As shown in FIGS. 1 and 2, a connecting member 16 which connects a front end portion of the front side frame 13 and a front portion of the apron reinforcement 12 in the vehicle vertical direction is provided at the front end portion of the front side frame 13.

Meanwhile, as shown in FIGS. 1 and 2, each of right-and-left both side portions, in the vehicle width direction, of the engine room 1 is covered with a front fender panel 17. Further, as shown in FIGS. 3 and 4, an upper side of the engine room 1 is covered with an openable bonnet 18.

The bonnet 18 comprises a bonnet outer panel 19 and a bonnet inner panel 20, which is integrally formed by the bonnet outer panel 19 and the bonnet inner panel 20 by a hemming process applied to a peripheral edge of the bonnet outer panel 19.

The bonnet 18 is configured such that a central portion, in the vehicle width direction, of its front end is supported at the vehicle body by means of a striker and a latch when the bonnet 18 is closed, and each of right-and-left both side, in the vehicle width direction, of its rear end is supported by means of a bonnet hinge which is provided at a bonnet hinge bracket 21 shown in FIG. 1.

As shown in FIGS. 3, 4 and 7, a cowl panel 13 having a roughly hat-shaped cross section is provided at an upper-end bent portion 3b of the dash lower panel 3 via a dash upper panel 22. A cowl closed-cross section 24 extending in the vehicle width direction is formed between the cowl panel 23 and the dash upper panel 22, whereby the rigidity of a cowl portion is improved.

As shown in FIGS. 3 and 4, the front window shield 11 is attached to an upper wall portion 23a of the cowl panel 23 which slants such that its rear side is located at a higher level than its front side via an adhesive 25. Further, as shown in FIGS. 3 and 4, a cowl center 26 which is a rain gutter extending forwardly from a front wall portion 23b of the cowl panel 23 is provided at the front wall portion 23b of the cowl panel 23.

As shown in FIGS. 2, 3 and 4, a battery 27 as an auxiliary equipment is arranged between the suspension tower portion 14 and the dash lower panel 3 in the vehicle longitudinal direction. In other words, these elements 14, 3, 27 are arranged such that the suspension tower portion 14, the battery 27, and the dash lower panel 3 are positioned in order from a vehicle front side to a vehicle rear side. Herein, in FIGS. 3 and 4, reference character 28 denotes a battery tray to receive the battery 27, and reference character 29 denotes a battery stay bracket.

Next, the cowl grille structure will be described. As shown in FIGS. 1, 3 and 4, a cowl grille 30 is provided below the front window shield 11 (obliquely below the front window shield 11 in the present embodiment) at a position located in front of the dash lower panel 3.

The cowl grille 30 comprises a member portion 31 which extends in the vehicle width direction below the front window shield 11 so as to receive water dripping from the front window shield 11 and right-and-left cover portions 32, 33 which are positioned in front of the member portion 31 and cover over the auxiliary equipment.

Herein, the left-side cover portion 32 covers over a reservoir (tank) as the auxiliary equipment which is arranged below this cover portion 32, and the right-side cover portion 33 covers over the battery 27 as the auxiliary equipment which is arranged below this cover portion 32.

The cowl grille structure of the vehicle of the present embodiment is configured to be substantially symmetrical laterally, and therefore the structure relating to the right-side cover portion 33. i.e., the right-side cowl grille structure will be described.

As shown in FIGS. 4 and 7, the cowl grille 30 comprises the above-described member portion 31, the above-described cover portion 33, the engine room 1 which is an engine-side space extending downwardly from the cover portion 33, a front partition portion 35 and a side partition portion 36 which partition a battery-arrangement space 34 which is an auxiliary equipment-side space, and a cowl seal 37 which contacts the bonnet 18 extending in the vehicle width direction (specifically, contacts the bonnet inner panel 20) so as to seal between the vehicle outside and the engine room 1.

As shown in the enlarged sectional view of FIG. 6, the member portion 31 comprises an upper wall portion 31a which extends in the vehicle width direction and in the vehicle longitudinal direction and a front-side vertical wall portion 31d and a rear-side vertical wall portion 31e which extend downwardly from a front end and a rear end of the upper wall portion 31a via a front corner portion 31b and a rear corner portion 31c.

Further, the above-described member portion 31 comprises a front side portion 31g which is positioned on the vehicle forward side of a middle step portion 31f of the upper wall portion 31a and a rear side portion 31h which is positioned on the vehicle rearward side of the middle step portion 31f. Further, the member portion 31 comprises a flange portion 31i which extends forwardly from a lower end of the front-side vertical wall portion 31d, an attachment base 31j which extends toward the bonnet 18 from the middle step portion 31f for attaching the cowl seal 37, and a contact side portion 31k which extends further rearwardly from the rear-side vertical wall portion 31e and contacts an upper face of an oblique lower end of the front window shield 11.

That is, the above-described member portion 31 is integrally formed by the resin-made elements 31a-31k. As shown in FIG. 6, the upper wall portion 31a formed by the front side portion 31g and the rear side portion 31h and the contact side portion 31k are configured to slant such that their rear sides are located at a higher level than their front sides, but the front-side vertical wall portion 31d and the rear-side vertical wall portion 31e are configured to slant such that their rear sides are located at a lower level than their front sides.

Further, as shown in FIGS. 1 and 7, plural mesh-shaped outside-air introduction holes 38 are formed at the rear side portion 31h of the upper wall portion 31a. As shown in FIGS. 3 and 4, the cowl seal 37 is arranged at a vehicle front part of the member portion 31, specifically at the attachment base 31j which is positioned at the front part of the member portion 31. Further, the cover portion 33 is made of a plate member and provided to perform heat insulating between an upper space 39 which is positioned above the cover portion 33 and a battery-arrangement space 34 of a lower space which is positioned below the cover portion 33.

By arranging the cowl seal 37 to seal between the vehicle outside and the engine room 1 at the front part of said member portion 31 as described above, the cover portion 33 positioned in front of the member portion 31 is prevented from becoming wet with the water, whereby the cover portion 33 is suppressed from being complicated. Further, by performing heat insulating between the upper space 39 and the battery-arrangement space 34 by means of the cover portion 33, the battery 27 as the auxiliary equipment is protected from the heat damage. That is, the water-wet prevention and the heat-damage prevention of the battery 27 as the auxiliary equipment are compatibly attained, without complicating the structure of the cover portion 33.

The cowl seal 37 is formed by a weather strip, an end portion, in the vehicle width direction, of which is attached to the apron reinforcement 12 via an end-portion member 40 as shown in FIG. 7. This end-portion member 40 may be integrated with or separated from the cowl seal 37.

As shown in FIG. 1, the end portion, in the vehicle width direction, of the cowl seal 37 is positioned closely to the bonnet hinge (see the bonnet hinge bracket 21) to support the bonnet 18. Accordingly, the support rigidity of the bonnet 18 is improved by the cowl seal 37.

Specifically, in a case where the cowl seal is forwardly positioned far from the bonnet hinges, the support rigidity of the bonnet by the cowl seal decreases, so that there is a concern that the rear end of the bonnet 18 may improperly lift up and swing in vehicle traveling. However, by positioning the end portion, in the vehicle width direction, of the cowl seal 37 closely to the bonnet hinge as described above, the support rigidity of the bonnet 18 is improved by the cowl seal 37.

Further, as shown in FIG. 1, a central portion, in the vehicle width direction, of the cowl seal 37 is positioned on the rearward side, in the vehicle longitudinal direction, of a central portion, in the vehicle longitudinal direction, of the cover portion 33. Thereby, the bonnet-support performance is improved by the central portion, in the vehicle width direction, of the cowl seal 37.

Specifically, it is required to enlarge an area of an opening for maintenance of the cover portion 33 and also enlarge an area of the outside-air introduction hole 38 which is formed at the member portion 31. Accordingly, the bonnet-support performance is improved by the central portion, in the vehicle width direction, of the cowl seal 37, securing both of the areas of the opening for the maintenance and the outside-air introduction hole 38 by setting the longitudinal position of the central portion, in the vehicle width direction, of the cowl seal 37 as described above.

As shown in FIG. 5, the cover portion 33 comprises an outer side portion 33a which is positioned on an outward side, in the vehicle width direction, thereof, a front side portion 33b which is positioned on a vehicle forward side, a front-side slant side portion 33c which extends obliquely inwardly-and-rearwardly from an inward end, in the vehicle width direction, of the front side portion 33b, an inner side portion 33d which is positioned on an inward side, in the vehicle width direction, thereof, and a rear side portion 33e which is positioned on a vehicle rearward side.

Further, the cover portion 33 comprises a cover body 33f which is continuous to the above-described respective side portions 33a-33e and covers over the battery-arrangement space 34. A flange portion 33h is integrally formed at a front portion of the cover body 33f which corresponds to the above-described front side portion 33b via a skirt portion 33g, and a flange portion 33j is integrally formed at a front portion of the cover body 33f which corresponds to the above-described front-side slant side portion 33c via a shirt portion 33i.

As shown in FIGS. 3-5, the cover body 33f of the cover portion 33 has a non-hole structure where no hole is formed, and an upper face of the cover body 33f is of substantially a smooth flat shape. Thereby, air in the upper space 39 which is positioned above the cover portion 33 suppresses the battery 27 as the auxiliary equipment from connecting to the lower space (battery-arrangement space 34) which is positioned below the cover portion 33, so that the further heat-damage prevention of the battery 27 is attained.

Further, the cover portion 33 is made of talc reinforced resin or fiber reinforced resin. Thereby, the heat-resistance property and the heat-insulating property of the cover portion 33 is improved, so that the further heat-damage prevention of the battery 27 as the auxiliary equipment is attained. Herein, the glass fiber reinforced plastic (GFRP) may be preferably used as the fiber reinforced resin.

Further, as shown in FIGS. 3 and 4, the cover portion 33 is positioned below, in the vertical direction, of the attachment base 31j of the member portion 31 as a cowl-seal attachment portion where the cowl seal 37 is attached.

Thereby, a vertical space is formed between the cowl seal 37 provided at the attachment base 31j and the cover portion 33, in other words, between a lower face of the bonnet inner panel 20 of the bonnet 18 and an upper face of the cover portion 33, which is superior in protection of a pedestrian. That is, the heat insulating structure by means of the cover portion 33 and the pedestrian protection is compatibly attained.

Moreover, as shown in FIG. 3, a support piece 33k which extends rearwardly from a rear-side lower face of the cover body 33f is integrally formed at the rear side portion 33e of the cover portion 33, and the flange portion 31i of the member portion 31 is supported such that it is interposed between the support piece 33k and a rear end portion of the cover body 33f. A heat-insulating seal member 41 is interposed between a lower face of a rear end of the cover body 33f of the cover portion 33 and an upper face of the flange portion 31i at the above-described insertion position of the flange portion 31i.

As shown in FIGS. 4 and 7, the above-described front partition portion 35 extends downwardly from the flange portions 33h, 33j of the cover portion 33 and partitions the battery-arrangement space 34 from the engine room 1. As shown in FIG. 4, an upper flange 35a and a lower flange 35b are integrally formed at an upper side and a lower side of the front partition portion 35. A heat-insulating seal member 42 is interposed between the upper flange 35a of the front partition portion 35 and the flange portions 33h, 33j of the cover portion 33. Further, as shown in FIG. 4, a heat-insulating seal member 43 is interposed between the lower flange 35b of the front partition portion 35 and the suspension tower portion 14 as well.

The side partition portion 36 shown in FIG. 7 extends downwardly from the flange portion 33j of the cover portion 33 and partitions the battery-arrangement space 34 from the engine room 1. A hanging front portion 36a of the side partition portion 36 contacts a suspension housing 44 via a heat-insulating seal member (not illustrated). Further, a hanging end portion 36b of the side partition portion 36 which extends downwardly contacts the front side frame 13 via a heat-insulating seal member (not illustrated).

Moreover, the structure of the present embodiment comprises, as shown in FIG. 7, an upper-end partition portion 45 which extends in the vehicle longitudinal direction and in the vehicle width direction, covering a whole part of a loser face of the member portion 31 of the cowl grille 30, a rear partition portion 46 which covers a front side of the dash lower panel 3, being forwardly spaced from the dash lower panel 3, and an upper partition portion 47 which extends in the vehicle width direction and covers a space between a lower face of a front part of the upper-end partition portion 45 and an upper face of a front part of an upper-end bent portion 46a of the rear partition portion 46.

The front partition portion 35, the side partition portion 36, and the upper-end partition portion 45 are respectively formed by an insulator which is made of polypropylene with 30% of glass reinforced fiber contained, and the rear partition portion 46 and the upper partition portion 47 are respectively formed by an insulator which is made of glass wool.

The glass wool is superior in sound absorbing as well as heat insulating, so that the engine noise is suppressed from being transmitted into the cabin 2 by using the glass wool for the upper partition portion 47, thereby securing the sound absorbing effect.

Herein, in the drawings, an arrow F shows the vehicle forward side, an arrow R shows the vehicle rearward side, an arrow OUT shows the outward side, in the vehicle width direction, of the structure, and an arrow UP shows the vehicle upward side.

As described above, the cowl grille structure of the vehicle of the present embodiment comprises the dash panel (dash lower panel 3) extending in the vehicle width direction below the lower end portion of the front windshield 11 and partitioning the engine room from the cabin 2 in the vehicle longitudinal direction, a pair of front side frames 13 extending forwardly from the both-end sides, in the vehicle width direction, of the dash panel (dash lower panel 3), the suspension tower portion 14 fixed at each of the front side frames 13 and protruding upwardly so as to support the upper portion of the damper of the suspension device, the auxiliary equipment (battery 27) provided between the suspension tower portion 14 and the dash panel (dash lower panel 3) in the vehicle longitudinal direction, and the cowl grille 30 positioned below the front windshield 11 and in front of the dash panel (dahs lower panel 3), wherein the cowl grille 30 comprises the member portion 31 which extends in the vehicle width direction below the front windshield 11 so as to receive water dripping from the front windshield 11, the cover portion 33 which is positioned in front of the member portion 31 and covers over the auxiliary equipment (battery 27), the partition portion (the front partition portion 35, the side partition 36) which extends downwardly from the cover portion 33 and partitions the space (engine room 1) where the engine is arranged from the other space (battery-arrangement space 34) where the auxiliary equipment (battery 27) is arranged, and the cowl seal 37 which extends in the vehicle width direction and contacts the bonnet 18 so as to seal between the vehicle outside space and the engine room 1, the cowl seal 37 is positioned at the front part of the member portion 31, and the cover portion 33 is made of the plate member and provided to perform the heat insulating between the space (upper space 39) positioned above the cover portion 33 and the other space (battery-arrangement space 34) positioned below the cover portion 33 (see FIGS. 1, 3 and 4).

According to this structure, since the cowl seal 37 to seal between the vehicle outside space and the engine room 1 is arranged at the front part of the member portion 31, the cover portion 33 which is positioned in front of the member portion 31 does not become wet with the water. Therefore, the cover portion 33 can be suppressed from being complicated.

Further, since the cover portion 33 performs the heat insulating between the space (upper space 39) positioned above the cover portion 33 and the other space (battery-arrangement space 34) positioned below the cover portion 33, the auxiliary equipment (battery 27) can be protected from the heat damage. That is, the water-wet prevention and the heat-damage prevention of the auxiliary equipment (battery 27) can be compatibly attained, without complicating the structure of the cover portion 33.

Further, in the present embodiment, the cover portion 33 has the non-hole structure where no hole is formed (see FIGS. 3, 4 and 5). According to this structure, since the cover portion 33 has the non-hole structure, the air in the upper space 39 positioned above the cover portion 33 suppresses the auxiliary equipment (battery 27) from connecting to the lower space (battery-arrangement space 34) positioned below the cover portion 33, so that the further heat-damage prevention of the auxiliary equipment (battery 27) can be attained.

Moreover, in the present embodiment, the cover portion 33 is made of the talc reinforced resin or the fiber reinforced resin (see FIGS. 3 and 4). According to this structure, the heat-resistance property and the heat-insulating property of the cover portion 33 can be improved, so that the further heat-damage prevention of the auxiliary equipment (battery 27) can be attained.

Also, in the present embodiment, the end portion, in the vehicle width direction, of the cowl seal 37 is positioned closely to the bonnet hinge (see the bonnet hinge bracket 21) to support the bonnet 18 (see FIG. 1). According to this structure, the support rigidity of the bonnet 18 can be improved by the cowl seal 37.

Specifically, the bonnet 18 is supported by the vehicle body at three points of the striker which is positioned at the center, in the vehicle width direction, of the front end of the bonnet 18 and a pair of hinges which are positioned at the left-and-right both sides, in the vehicle width direction, of the rear end of the bonnet 18, and the rear-end side of the bonnet 18 is supported by the cowl seal 37 when the bonnet 18 is closed.

Herein, in a case where the cowl seal is forwardly positioned far from the bonnet hinges, the support rigidity of the bonnet by the cowl seal decreases, so that there is a concern that the rear end of the bonnet 18 may improperly lift up and swing.

The bonnet itself is excessively reinforced by a reinforcement or the like in order to suppress the bonnet from lifting up and swinging improperly in the conventional structure. According to this structure, however, the support rigidity of the bonnet 18 can be improved by appropriate positioning of the cowl seal 37, without reinforcing the bonnet 18 excessively.

Additionally, in the present embodiment, the central portion, in the vehicle width direction, of the cowl seal 37 is positioned on the rearward side, in the vehicle longitudinal direction, of the central portion, in the vehicle longitudinal direction, of the cover portion 33 (see FIG. 1). According to this structure, the bonnet-support performance can be improved by the central portion, in the vehicle width direction, of the cowl seal 37.

Specifically, it is required to enlarge an area of an opening for maintenance of the cover portion 33 and also enlarge an area of the outside-air introduction hole which is formed at the member portion 31 of the cowl grille 30.

Accordingly, the bonnet-support performance can be improved by the central portion, in the vehicle width direction, of the cowl seal 37, securing both of the areas of the opening for the maintenance and the outside-air introduction hole by setting the longitudinal position of the central portion, in the vehicle width direction, of the cowl seal 37 as described above.

Further, in the present embodiment, the cover portion 33 is positioned below, in the vertical direction, of the cowl-seal attachment portion (he attachment base 31j of the member portion 31) where the cowl seal 37 is attached (see FIGS. 3 and 4).

According to this structure, a vertical space is formed between the cowl seal 37 provided at the cowl-seal attachment portion (attachment base 31j) and the cover portion 33, in other words, between a lower face of the bonnet 18 and the cover portion 33, which is superior in protection of a pedestrian. That is, the heat insulating structure by means of the cover portion 33 and the pedestrian protection can be compatibly attained.

In correspondence between the present invention and the above-described embodiment, the space where the engine is arranged of the present invention corresponds to the engine room 1 of the embodiment. Likewise, the bonnet hinge corresponds to the bonnet hinge bracket 21, the auxiliary equipment corresponds to the battery 27, the cowl-seal attachment portion corresponds to the attachment base 31j of the member portion 31, the space where the auxiliary equipment is arranged and the space positioned below the cover portion correspond to the battery-arrangement space 34, the partition portion corresponds to the front partition portion 35 and the side partition portion 36, and the space positioned above the cover portion corresponds to the upper space 39. The present invention is not be limited to the above-described embodiment, and any other modified embodiments can be provided.

What is claimed is:

1. A cowl grille structure of a vehicle, comprising:
a dash panel extending in a vehicle width direction below a lower end portion of a front windshield and partitioning an engine room from a cabin in a vehicle longitudinal direction;
a pair of front side frames, each of which extends forwardly from a respective end, in the vehicle width direction, of the dash panel;
a suspension tower portion fixed at each of the front side frames and protruding upwardly so as to support an upper portion of a damper of a suspension device;
an auxiliary equipment provided between the suspension tower portion and the dash panel in the vehicle longitudinal direction; and
a cowl grille positioned below the front windshield and in front of the dash panel,
wherein said cowl grille comprises a member portion which extends in the vehicle width direction below the front windshield so as to receive water dripping from the front windshield, a cover portion which is positioned in front of said member portion and covers over said auxiliary equipment, a partition portion which extends downwardly from said cover portion and partitions a space where an engine is arranged from another space where said auxiliary equipment is arranged, and a cowl seal which extends in the vehicle width direction and contacts a bonnet so as to seal between a vehicle outside space and an engine room,
said cowl seal is positioned at a front part of said member portion,
said cover portion is made of a plate member and provided to perform heat insulating between a space positioned above the cover portion and another space positioned below the cover portion, and
a central portion, in the vehicle width direction, of said cowl seal is positioned on a rearward side, in the vehicle longitudinal direction, of a central portion, in the vehicle longitudinal direction, of said cover portion.

2. The cowl grille structure of the vehicle of claim 1, wherein said cover portion has a non-hole structure where no hole is formed.

3. The cowl grille structure of the vehicle of claim 2, wherein said cover portion is made of talc reinforced resin or fiber reinforced resin.

4. The cowl grille structure of the vehicle of claim 3, wherein an end portion, in the vehicle width direction, of said cowl seal is positioned closely to a bonnet hinge to support the bonnet.

5. The cowl grille structure of the vehicle of claim 1, wherein said cover portion is made of talc reinforced resin or fiber reinforced resin.

6. The cowl grille structure of the vehicle of claim 1, wherein an end portion, in the vehicle width direction, of said cowl seal is positioned closely to a bonnet hinge to support the bonnet.

7. The cowl grille structure of the vehicle of claim 1, wherein said cover portion is positioned below, in a vertical direction, of a cowl-seal attachment portion where said cowl seal is attached.

8. The cowl grille structure of the vehicle of claim 1, wherein a heat-insulating seal member is interposed between an upper flange of said partition portion and a flange portion of said cover portion.

9. The cowl grille structure of the vehicle of claim 1, wherein said partition portion is made of fiber reinforced resin.

* * * * *